(12) United States Patent
Ito et al.

(10) Patent No.: US 10,840,736 B2
(45) Date of Patent: Nov. 17, 2020

(54) INFORMATION TERMINAL, INFORMATION PROCESSING METHOD, AND RECORDING MEDIUM

(71) Applicant: Panasonic Intellectual Property Management Co., Ltd., Osaka (JP)

(72) Inventors: Yoshikatsu Ito, Osaka (JP); Nobuhiro Kitamura, Tokyo (JP); Hirotada Higashihama, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 227 days.

(21) Appl. No.: 16/062,816

(22) PCT Filed: Dec. 19, 2016

(86) PCT No.: PCT/JP2016/005172
§ 371 (c)(1),
(2) Date: Jun. 15, 2018

(87) PCT Pub. No.: WO2017/115457
PCT Pub. Date: Jul. 6, 2017

(65) Prior Publication Data
US 2018/0375374 A1 Dec. 27, 2018

(30) Foreign Application Priority Data

Dec. 28, 2015 (JP) .................. 2015-257500

(51) Int. Cl.
*H02J 13/00* (2006.01)
*G06F 13/00* (2006.01)
(Continued)

(52) U.S. Cl.
CPC .......... *H02J 13/0013* (2013.01); *G05B 15/02* (2013.01); *G06F 13/00* (2013.01);
(Continued)

(58) Field of Classification Search
CPC .... H02J 13/0013; H02J 13/00001; H02J 7/35; H02J 7/0047; H02J 13/0062; H02J 3/32;
(Continued)

(56) References Cited

U.S. PATENT DOCUMENTS

2006/0259332 A1* 11/2006 Brown ................... G05B 15/02
705/3
2012/0256009 A1* 10/2012 Mucignat ............. G05D 23/193
236/1 C
(Continued)

FOREIGN PATENT DOCUMENTS

JP 2004-200755 A 7/2004
JP 2012-73740 A 4/2012
(Continued)

OTHER PUBLICATIONS

Extended European Search Report dated Jan. 25, 2019 for the corresponding European patent application No. 16881438.2.
(Continued)

*Primary Examiner* — Ziaul Karim
(74) *Attorney, Agent, or Firm* — Renner, Otto, Boisselle & Sklar, LLP

(57) ABSTRACT

An information terminal includes: a first communication unit that performs wireless communication with a wireless base station connected to a wide area network; a second communication unit that performs communication by a communication scheme different from the first communication unit; and a controller that: controls the second communication unit to receive first management information from a power management system that is installed in a facility and includes a storage battery, the first management information including information relating to the storage battery; and controls the first communication unit to transmit second management information generated based on the first management information received, to a server outside the facility
(Continued)

as a destination, the server being connected to the wide area network.

16 Claims, 14 Drawing Sheets

(51) Int. Cl.
| | |
|---|---|
| *H04Q 9/00* | (2006.01) |
| *G08B 25/10* | (2006.01) |
| *H02J 7/35* | (2006.01) |
| *H02J 7/00* | (2006.01) |
| *H02J 3/32* | (2006.01) |
| *G05B 15/02* | (2006.01) |
| *H04B 5/00* | (2006.01) |
| *H04L 12/28* | (2006.01) |

(52) U.S. Cl.
CPC ............... *G08B 25/10* (2013.01); *H02J 3/32* (2013.01); *H02J 7/0047* (2013.01); *H02J 7/35* (2013.01); *H02J 13/00001* (2020.01); *H02J 13/0062* (2013.01); *H02J 13/0075* (2013.01); *H02J 13/0079* (2013.01); *H04B 5/0031* (2013.01); *H04L 12/2854* (2013.01); *H04Q 9/00* (2013.01); *H02J 13/00* (2013.01)

(58) Field of Classification Search
CPC .... H02J 13/0079; H02J 13/0075; H02J 13/00; G06F 13/00; H04Q 9/00; G08B 25/10; G05B 15/02; H04B 5/0031; H04L 12/2854
See application file for complete search history.

(56) References Cited

U.S. PATENT DOCUMENTS

| | | | |
|---|---|---|---|
| 2014/0277788 A1* | 9/2014 | Forbes, Jr. ................ | G05F 1/66 700/286 |
| 2015/0094968 A1* | 4/2015 | Jia .......................... | G06Q 50/06 702/60 |

FOREIGN PATENT DOCUMENTS

| | | |
|---|---|---|
| JP | 2014-79058 A | 5/2014 |
| JP | 2014-132827 A | 7/2014 |
| JP | 2015-99471 A | 5/2015 |
| WO | 2015/160779 A1 | 10/2015 |

OTHER PUBLICATIONS

Office Action dated Dec. 18, 2018 for the corresponding Japanese patent application No. 2015-257500.
International Search Report (ISR) dated Feb. 21, 2017 in International (PCT) Application No. PCT/JP2016/005172.

* cited by examiner

| STORAGE BATTERY INFORMATION | ID | | BA0012345A |
| --- | --- | --- | --- |
| | STATE CODE | | 200 |
| | CHARGE/DISCHARGE MODE | | CHARGE |
| | REMAINING BATTERY LEVEL (CHARGE LEVEL) | | 70% |
| | TEMPERATURE | | 25°C |
| | CHARGING CURRENT | | 15A |
| | USE HISTORY | USE DAYS | 432 DAYS |
| | | MAXIMUM TEMPERATURE | 30°C |
| | ⋮ | ⋮ | ⋮ |
| POWER GENERATION DEVICE INFORMATION | ID | | PS000100 |
| | STATE CODE | | 200 |
| | ⋮ | ⋮ | ⋮ |
| ⋮ | ⋮ | ⋮ | ⋮ |

CONTROL INFORMATION

| OUTPUT SUPPRESSION COMMAND | ⋮ | ⋮ |
|---|---|---|
| | TIME (PERIOD) | 20X6/08/01 12:00-16:00 |
| | TIME (PERIOD) | 20X6/08/02 12:00-16:30 |
| | ⋮ | ⋮ |
| ⋮ | ⋮ | ⋮ |

INFORMATION TERMINAL, INFORMATION PROCESSING METHOD, AND RECORDING MEDIUM

TECHNICAL FIELD

The present invention relates to an information terminal that processes management information in cooperation with a power management system that performs power control and management for a storage battery, and an information processing method and a recording medium used in the information terminal.

BACKGROUND ART

Regarding power storage devices (devices including storage batteries) used in power consumer facilities such as houses and office buildings, systems that control charging and discharging of a storage battery in response to operation by a tablet terminal or the like are conventionally known (see PTL 1).

CITATION LIST

Patent Literature

PTL 1: Japanese Unexamined Patent Application Publication No. 2014-79058

SUMMARY OF THE INVENTION

Technical Problem

In the case where an abnormality occurs in a power storage device installed in a consumer facility or a power management system that performs control and management for the power storage device, a person without sufficient expertise in power storage devices and the like (e.g. ordinary consumer) has difficulty in appropriately handling the situation. To efficiently handle such an occurrence of an abnormality in a power management system of each consumer, it is useful to remotely monitor the power management system in the consumer facility by an external server operated by, for example, a maintenance company with expertise, through a wired subscribed telephone (fixed line) installed in the consumer facility. In recent years, however, an increasing number of houses, dwelling units, and the like are not installed with fixed lines.

The present invention therefore has an object of providing an information terminal that, in a facility without a fixed line, cooperates with a power management system in order to enhance the possibility of appropriately operating the power management system (e.g. handling an occurrence of an abnormality). The present invention also has an object of providing an information processing method and a recording medium used in the information terminal.

Solution to Problem

To achieve the object stated above, an information processing method according to an aspect of the present invention is an information processing method used in an information terminal including: a first communication unit that performs wireless communication with a wireless base station connected to a wide area network; and a second communication unit that performs communication by a communication scheme different from the first communication unit, the information processing method including: receiving, by the second communication unit, first management information from a power management system that is installed in a facility and includes a storage battery, the first management information including information relating to the storage battery; and transmitting, by the first communication unit, second management information generated based on the first management information received in the receiving, to a device outside the facility as a destination, the device outside the facility being connected to the wide area network.

An information terminal according to an aspect of the present invention is an information terminal, including: a first communication unit that performs wireless communication with a wireless base station connected to a wide area network; a second communication unit that performs communication by a communication scheme different from the first communication unit; and a controller that: controls the second communication unit to receive first management information from a power management system that is installed in a facility and includes a storage battery, the first management information including information relating to the storage battery; and controls the first communication unit to transmit second management information generated based on the first management information received, to a device outside the facility as a destination, the device outside the facility being connected to the wide area network.

A recording medium according to an aspect of the present invention is a non-transitory computer-readable recording medium having stored therein a control program for causing an information terminal to execute predetermined information processing, the information terminal including: a first communication unit that performs wireless communication with a wireless base station connected to a wide area network; a second communication unit that performs communication by a communication scheme different from the first communication unit; and a microprocessor, the predetermined information processing including: causing the second communication unit to receive first management information from a power management system that is installed in a facility and includes a storage battery, the first management information including information relating to the storage battery; and causing the first communication unit to transmit second management information generated based on the first management information received, to a device outside the facility as a destination, the device outside the facility being connected to the wide area network.

Advantageous Effect of Invention

According to the present invention, the power management system can be remotely monitored by a server. For example, the use of expertise of a maintenance company operating the server enables appropriately operating the power management system (e.g. appropriately handling an occurrence of an abnormality).

DESCRIPTION OF EXEMPLARY EMBODIMENTS

Embodiments are described below, with reference to drawings. The embodiments described below each show a specific example of the present invention. The numerical values, shapes, structural elements, the arrangement and connection of the structural elements, steps, the order of steps, etc. shown in the following embodiments are mere examples, and do not limit the scope of the present invention. Of the structural elements in the embodiments described below, the structural elements not recited in any one of the independent claims are structural elements that may be added optionally. Each drawing is a schematic, and does not necessarily provide precise depiction.

Embodiment 1

Information terminal 400 according to an embodiment of the present invention is described below.
(Structure)

Figure 1:
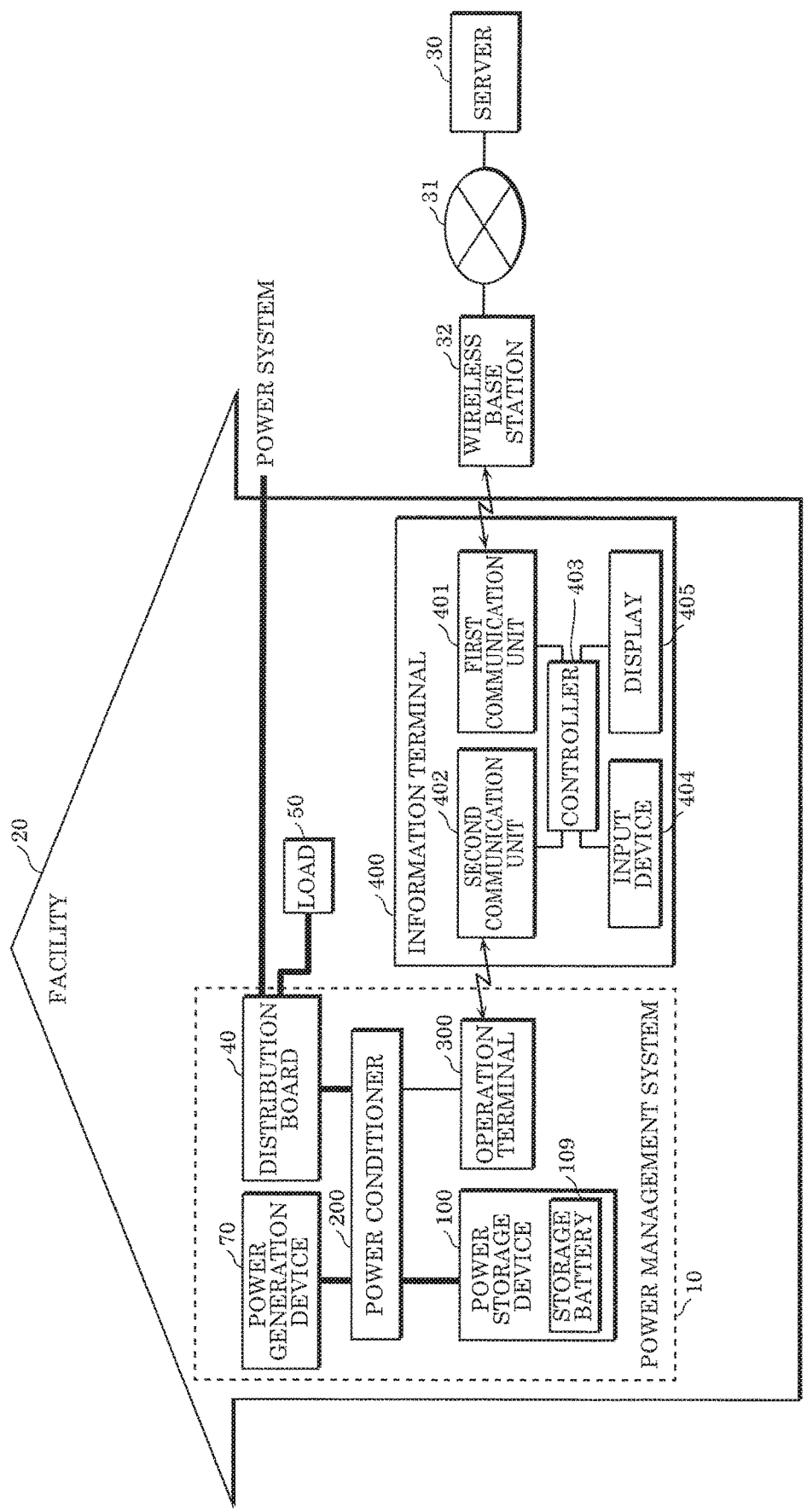
FIG. 1 is a schematic diagram illustrating the structures, etc. of an information terminal and a power management system according to Embodiment 1.

FIG. 1 illustrates information terminal 400 and power management system 10 according to Embodiment 1, together with relevant devices.

Power management system 10 is a system that is installed in facility 20 of a power consumer such as a house, an office building, or the like, and manages and controls power storage device 100, etc. so that power is stored in storage battery 109 and discharged when necessary. As illustrated in FIG. 1, power management system 10 includes power storage device 100, power conditioner 200, operation terminal 300, distribution board 40, and power generation device 70 installed in facility 20.

Distribution board 40 is installed in facility 20, and distributes, to load 50, etc., power (system power) received from a power system which is a facility of an electric power provider or the like. Load 50 represents electrical appliances, etc. in facility 20. Each individual electrical appliance is connected to any of a plurality of branch circuits in distribution board 40.

Power generation device 70 is, for example, a solar cell module for solar power generation, and generates power. Power generated by power generation device 70 is transferred to distribution board 40 or power storage device 100 via power conditioner 200.

Power storage device 100, for example, includes storage battery 109 such as a lithium-ion secondary battery or a lead storage battery, and further includes a control circuit for controlling storage battery 109. Power storage device 100 is used, for example, to efficiently use power through power storage and discharge or prepare for a power failure. Storage battery 109 is composed of one or more secondary batteries as a unit. For example, the unit may be any of a battery cell, a battery module which is a collection of battery cells, and a battery pack (battery unit) which is a collection of battery modules. Power storage device 100 includes a temperature sensor. The control circuit can transmit information relating to the storage battery such as the temperature measured by the temperature sensor and the remaining battery level (charge level), to power conditioner 200.

Figures 2, 3:
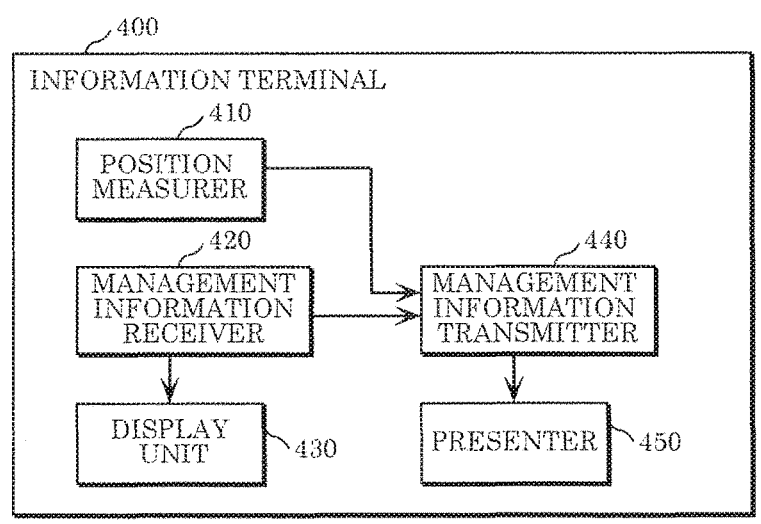
FIG. 2 is a diagram illustrating an example of management information used in the power management system.
FIG. 3 is a functional block diagram of the information terminal according to Embodiment 1.

Power conditioner 200 is a power conversion device that is connected to power generation device 70, power storage device 100, and distribution board 40 and performs, for example, conversion between direct-current power and alternating-current power. Power conditioner 200 includes a computer, and has a function of managing and controlling power generation device 70, power storage device 100, etc. The computer includes memory, a processor (microprocessor), a communication interface (I/F), and so on. The memory includes, for example, ROM holding programs and data beforehand and RAM used for storing data, etc. during program execution, and may include nonvolatile memory. The processor executes programs stored in the memory, to control the communication I/F and the like and perform various processes. The communication I/F is a communication circuit for communicating with, for example, power generation device 70, power storage device 100, or operation terminal 300. Power conditioner 200 is capable of such control that allows power generated by power generation device 70 to be output to the power system via distribution board 40 or block (suppress) the output, according to a predetermined algorithm as an example. Power conditioner 200 also performs control to charge (i.e. current input) power storage device 100 (storage battery 109) and discharge (i.e. current output) power storage device 100, according to a predetermined algorithm. Through such control, power conditioner 200, for example, receives system power distributed from distribution board 40 or power generated by power generation device 70 and charges power storage device 100, and supplies power discharged from power storage device 100 to load 50 via distribution board 40. In the case of receiving instruction information from operation terminal 300, power conditioner 200 determines the details of control relating to charge/discharge of power storage device 100 and performs the control relating to charge/discharge, in response to the instruction information. For example, power conditioner 200 selectively determines the charge/discharge mode of power storage device 100 to be charge or discharge, in response to the instruction information. The computer in power conditioner 200, for example, manages the control states of power storage device 100 and power generation device 70, and records and sequentially updates management information in a storage medium such as memory, based on storage battery-related information received from power storage device 100 and the like. FIG. 2 illustrates an example of management information. The management information includes storage battery information indicating the identification information (ID), state, charge/discharge mode, remaining battery level, temperature, charging current, use history, etc. of the storage battery of power storage device 100, power generation device information indicating the identification information (ID), state, etc. of power generation device 70, and so on. The computer in power conditioner 200 controls each device based on management information, and transmits management information to operation terminal 300 as necessary.

Operation terminal 300 is a terminal (e.g. remote control) having a function of receiving an operation of a user (e.g. power consumer) and transmitting instruction information corresponding to the operation to power conditioner 200. Operation terminal 300 includes a user I/F such as an input device and a display. Operation terminal 300 is connected to power conditioner 200 via a wired or wireless local area network (LAN) or the like in facility 20. The instruction information is, for example, information for instructing power conditioner 200 to perform current input/output (charge/discharge) on power storage device 100, such as an instruction to set power storage device 100 to a discharge state or an instruction to set power storage device 100 to a storage state. For example, the instruction information may be information for selectively designating any of various charge/discharge control algorithms (charge/discharge mode, etc.) set beforehand for power storage device 100. The operation terminal can obtain management information from power conditioner 200 and display, for example, part (e.g. information relating to storage battery 109) of the management information on a display at any time.

Information terminal 400 is a computer terminal that is portable and performs wireless communication with wireless base station 32 managed by a communication company (mobile phone company) or the like. For example, information terminal 400 is a smartphone. Wireless base station 32 is connected to wide area network (WAN) 31 such as a telephone communication network or the Internet. Information terminal 400 can communicate with server 30 via wireless base station 32 and the like. Server 30 is a computer connected to wide area network 31, and is operated by, for example, a maintenance company performing maintenance service, etc. for power management system 10, an electric power provider, a power storage device manufacturer, or other company. Information terminal 400 is carried by the user. As illustrated in FIG. 1, information terminal 400 includes first communication unit 401, second communication unit 402, controller 403, input device 404, and display 405.

First communication unit 401 is a communication I/F that performs wireless communication with wireless base station 32 by a predetermined communication scheme. The communication scheme of first communication unit 401 is a scheme of communication based on a predetermined communication standard such as 3G or 4G (Long Term Evolution (LTE), etc.) using a frequency band set beforehand for each communication company.

Second communication unit 402 is a communication I/F that performs near field communication (NFC) with power management system 10 by a predetermined communication scheme different from first communication unit 401. The communication scheme of second communication unit 402 is a scheme (near field communication scheme) of communication based on a near field communication standard such as Bluetooth®.

Controller 403 includes memory and a processor. Controller 403 controls each part of information terminal 400 and performs various processes, by the processor executing programs stored in the memory. The processes by controller 403 include, for example, a storage battery information display process. In the storage battery information display process, controller 403 controls second communication unit 402 to receive management information (see FIG. 2) from power management system 10. Controller 403 then controls first communication unit 401 to transmit second management information generated based on the received management information (also referred to as "first management information") to server 30 as a destination. The storage battery information display process will be described in detail later.

Input device 404 and display 405 constitute a user I/F of information terminal 400. The user I/F is, for example, a touch panel obtained by providing touchpad (input device) 404 on the surface of display 405.

Information terminal 400 executes an application program (referred to as "application") for performing predetermined information processing including the storage battery information display process, etc. Information terminal 400 may download the application from a web server (e.g. server 30) connected to wide area network 31, to store the application in the memory. Information terminal 400 achieves the functions of the functional structural elements illustrated in FIG. 3, i.e. position measurer 410, management information receiver 420, display unit 430, management information transmitter 440, and presenter 450, by the processor in controller 403 executing the application. Each functional structural element in information terminal 400 is described below.

Position measurer 410 has a function of measuring the position of information terminal 400 and providing position information indicating the position to management information transmitter 440. For example, in the case where information terminal 400 includes a Global Positioning System (GPS) receiver, position measurer 410 repeatedly receives a GPS signal to obtain position information indicating the latitude, longitude, etc. of the position of information terminal 400, and holds position information obtained most recently. Position measurer 410 may cause first communication unit 401 to perform wireless communication with one or more wireless base stations including wireless base station 32, to obtain position information indicating the position of information terminal 400 based on a reception signal, the position of the wireless base station, and the like.

Management information receiver 420 has a function of receiving the first management information (see FIG. 2) from power management system 10, by second communication unit 402. Management information receiver 420 may receive the first management information from any device included in power management system 10. It is assumed here that management information receiver 420 causes second communication unit 402 to perform near field communication with operation terminal 300, to receive the first management information from operation terminal 300. The reception of the first management information is based on the precondition that, for example in response to a user operation, pairing (mutual authentication) is made between information terminal 400 and operation terminal 300 via Bluetooth®.

Display unit 430 has a function of displaying, on display 405, a display element (e.g. a character string, an image, etc. indicating the state of the storage battery) representing the whole or part of the first management information, based on the first management information received by management information receiver 420. This function enables the user to recognize management information (information of the state of the storage battery, etc.) in power management system 10 by viewing information terminal 400 which he or she carries. Smartphones including processors with comparatively high processing performance and displays capable of displaying multicolor display elements with comparatively high resolution are widely used. In the case of using such a smartphone as information terminal 400, display unit 430 can promptly generate and display display elements in various forms easily understandable by the user, based on the management information.

Management information transmitter 440 has a function of transmitting the second management information generated based on the first management information received by management information receiver 420 to server 30 via wireless base station 32, by first communication unit 401. The second management information may be the same as the first management information, part of the first management information, or the whole or part of the first management information to which other information is added. The first management information and the second management information may have the same format (data form, data structure, whether or not compressed, whether or not encrypted, etc.) or different formats. It is assumed here that the second management information substantially includes the whole of the first management information. Management information transmitter 440 adds, to the second management information including the first management information, the position information obtained by position measurer 410, and transmits the resultant second management information to server 30. Management information transmitter 440 also has a function of receiving a message from server 30 as a response to this transmission.

Presenter 450 has a function of presenting the message received from server 30, to the user. The presentation of the message is realized by, for example, displaying the message on display 405 or, in the case where information terminal 400 includes a speaker or the like, outputting the message by sound.

(Operation)

An example (operation example) of an information processing method in information terminal 400 that cooperates with power management system 10 with the above-mentioned structure is described below.

Figure 4:
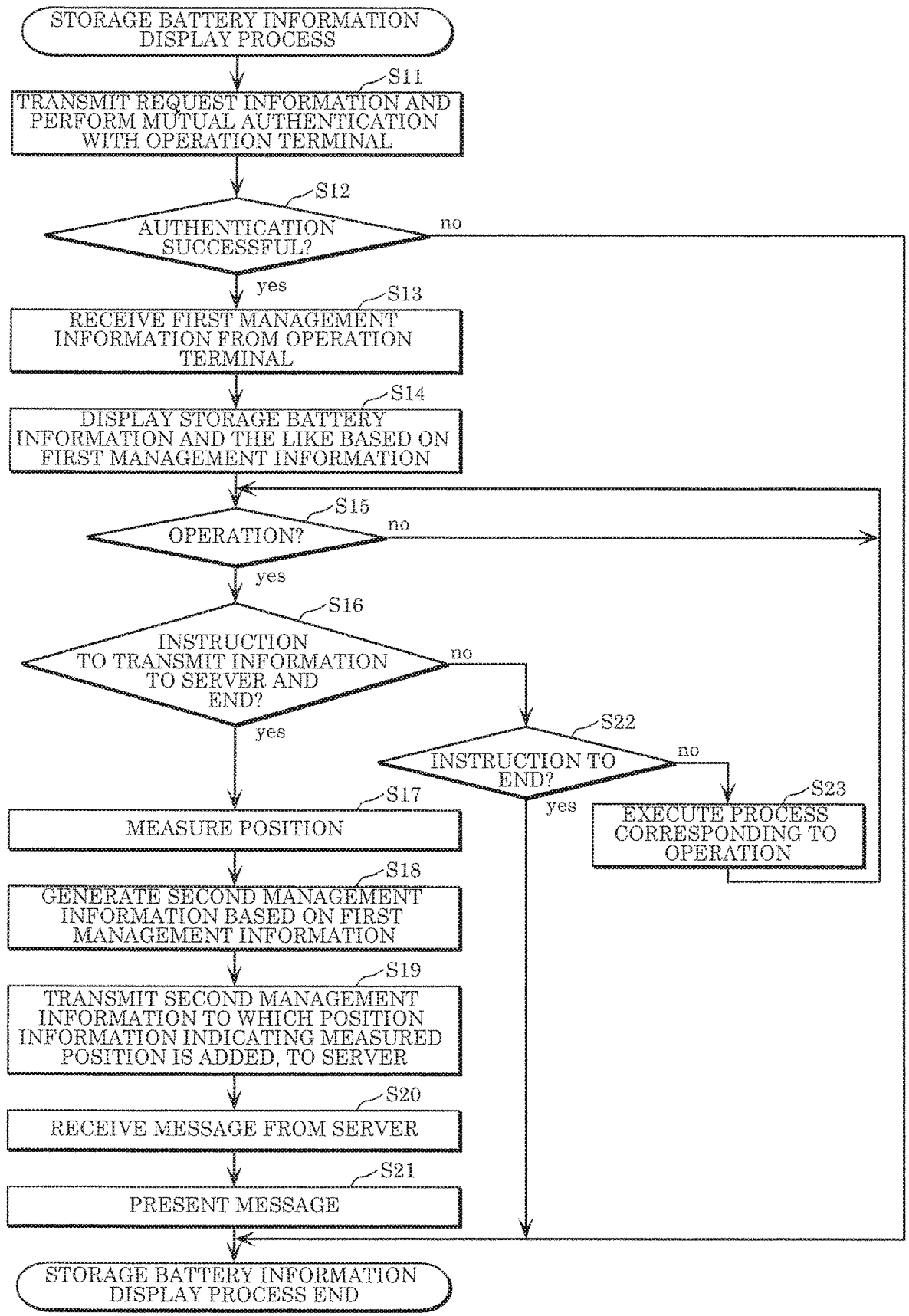
FIG. 4 is a flowchart illustrating an example of a storage battery information display process in the information terminal according to Embodiment 1.

FIG. 4 is a flowchart illustrating an example of the storage battery information display process in information terminal 400. The storage battery information display process is described below, with reference to the drawing. For example, when the user performs a predetermined operation to start the application for performing the predetermined information processing on information terminal 400, the storage battery information display process is carried out. The user performs an operation to start the application, for example when he or she wants to check the operation status (e.g. storage battery state) of power management system 10 on his or her terminal at hand.

For example upon receiving the predetermined operation to start the application for performing the predetermined information processing by input device 404, information terminal 400 transmits request information by second communication unit 402 and performs mutual authentication with operation terminal 300, in order to receive management information from power management system 10 (Step S11). The request information may be any information that serves as a request for management information. For example, the request information may be a request for pairing by Bluetooth®, or information for pairing (mutual authentication) such as a personal identification number (PIN) code. In the case where the mutual authentication is not successful, the storage battery information display process ends.

In the case where the mutual authentication in Step S11 is successful (Step S12), information terminal 400 and operation terminal 300 enter a wireless connection state. Information terminal 400 receives the management information (first management information) using second communication unit 402, by management information receiver 420 (Step S13). Here, operation terminal 300 may receive management information from power conditioner 200 at any time and hold the management information, and transmit the held management information to information terminal 400. Alternatively, operation terminal 300 may receive management information from power conditioner 200 and transmit the management information to information terminal 400, after receiving the request information from information terminal 400.

Figure 5:
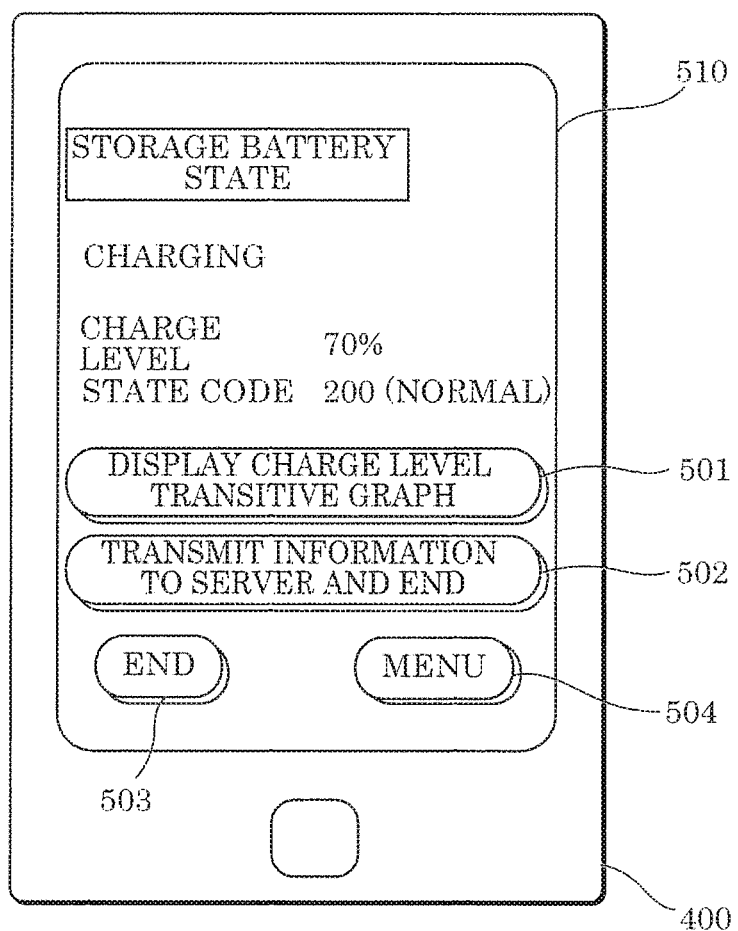
FIG. 5 is a diagram illustrating an example of a screen of the information terminal according to Embodiment 1.

When the first management information is received by management information receiver 420, information terminal 400 generates a display element representing storage battery information and the like based on the first management information and displays the display element on display 405, by display unit 430 (Step S14). FIG. 5 illustrates an example of a screen of display 405 in information terminal 400 displaying the display element in Step S14. Screen 510 illustrated in FIG. 5 represents the storage battery state that charging is being performed normally and the charge level is 70%, and includes buttons 501 to 504 as graphical user interface (GUI) components. For example, button 501 is a user operation button for switching to a screen displaying changes in storage battery charge level in a graph based on the use history and the like in the first management information. Button 502 is a user operation button for instructing to transmit the management information (i.e. the second management information generated based on the first management information) of power management system 10 to server 30 and end. Button 503 is a user operation button for ending the storage battery information display process. Button 504 is a user operation button for instructing to perform other processes. In response to a user operation on any of these buttons, information terminal 400 performs a predetermined process.

In the case of receiving an operation by the user (Step S15), if the operation is an operation of pressing button 502 for instructing to transmit management information to server 30 and end (Step S16), information terminal 400 proceeds to the process in Step S17. If the operation is an operation of pressing button 503 for instructing to end (Step S22), information terminal 400 ends the storage battery information display process. If the operation is an operation of pressing any other button, information terminal 400 executes a process corresponding to the operation (Step S23). In Step S23, for example in the case where button 501 is pressed, display unit 430 performs calculation necessary for displaying a graph of changes in charge level based on the first management information, and displays the graph. Information terminal 400 repeatedly receives an operation and executes a process corresponding to the operation, until an operation to end the process is performed (Steps S15, S16, S22, S23).

In Step S17, information terminal 400 measures the position of information terminal 400 when the first management information is received by management information receiver 420, by position measurer 410. Information terminal 400 thus obtains position information. In detail, information terminal 400 measures the position by position measurer 410 and generates position information indicating the position. Alternatively, information terminal 400 obtains position information measured most recently and held, as position information indicating the position of information terminal 400 when the first management information is received.

Information terminal 400 then generates the second management information based on the first management information, by management information transmitter 440 (Step S18). Following this, management information transmitter 440 in information terminal 400 transmits the second management information to which the position information generated or obtained in Step S17 is added, to server 30 using first communication unit 401 (Step S19).

Management information transmitter 440 then receives a message from server 30 as a response (Step S20). Presenter 450 presents the message (Step S21).

Figure 6:
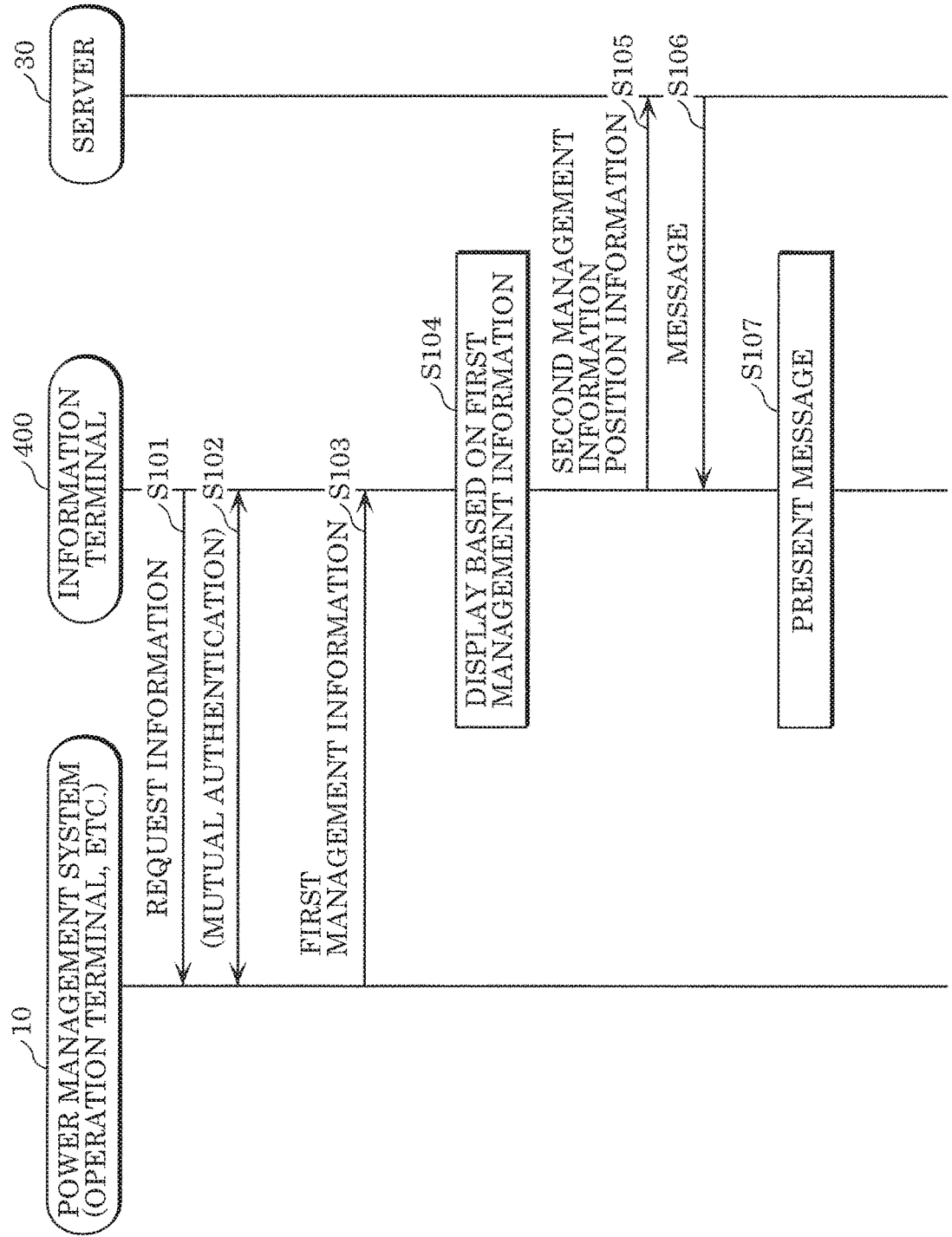
FIG. 6 is a sequence diagram illustrating the cooperation of the information terminal, the power management system, and a server according to Embodiment 1.

FIG. 6 illustrates a process sequence among power management system 10 (operation terminal 300), information terminal 400, and server 30, as an execution example of the storage battery information display process described above.

As illustrated in the example in FIG. 6, in the case where the user performs the predetermined operation on information terminal 400 and starts the application for the predetermined information processing in order to check the storage battery state and the like, information terminal 400 transmits the request information to operation terminal 300 (Step S101), and mutual authentication is performed (Step S102). Operation terminal 300 in power management system 10 then transmits the first management information to information terminal 400 by near field communication (Step S103). Information terminal 400 displays screen 510 illustrated in FIG. 5, based on the first management information (Step S104). Upon receiving an operation of pressing button 502 by the user, information terminal 400 transmits the second management information including the first management information, to which the position information is added, to server 30 via wireless base station 32 (Step S105). Server 30 receives the second management information, and, for example, selects a message depending on the second management information and transmits the message to information terminal 400 (Step S106). For example, server 30 transmits, to information terminal 400, a message indicating the details of the state code indicating the storage battery state in the received second management information. Upon receiving the message, information terminal 400 presents the message (Step S107). The message is, for example, a character string, audio data, or the like set beforehand in server 30.

Thus, information terminal 400 transmits information (second management information) corresponding to management information (first management information) in power management system 10, to server 30 via wireless base station 32. Hence, even when facility 20 is not installed with a fixed line, server 30 can obtain the information corresponding to the management information. Server 30 can then store and process the management information. A party (referred to as "maintenance company or the like") operating server 30 and able to view information obtained by server 30 can recognize the status of power management system 10, and, for example in the case where an abnormality occurs, appropriate handle the situation. The maintenance company or the like is a maintenance company performing maintenance service, etc. for the power management system, an electric power provider, a power storage device manufacturer, or other company. Since position information is transmitted from information terminal 400 to server 30, the maintenance company or the like can identify and manage power management system 10 of each consumer (each facility). Therefore, for example in the case where an abnormality occurs in the storage battery or the like in power management system 10, personnel in the maintenance company or the like can promptly rush to facility 20.

Embodiment 2

Information terminal 400*a* according to an embodiment of the present invention is described below. Information terminal 400*a* is a partial modification to information terminal 400 described in Embodiment 1. In information terminal 400, each time the user performs the operation (operation of pressing button 502) for instructing to transmit the management information of power management system 10 to server 30, the second management information is transmitted to server 30. Information terminal 400*a*, on the other hand, has a function of periodically transmitting the second management information to server 30.

(Structure)

Information terminal 400*a* has the same hardware structure as information terminal 400, and is the same as information terminal 400 in that it cooperates with power management system 10 described in Embodiment 1 and accesses server 30 (see FIG. 1). Information terminal 400*a* differs from information terminal 400 in that it executes an application for performing predetermined information processing that includes a periodic transmission process in addition to the storage battery information display process.

Figure 7:
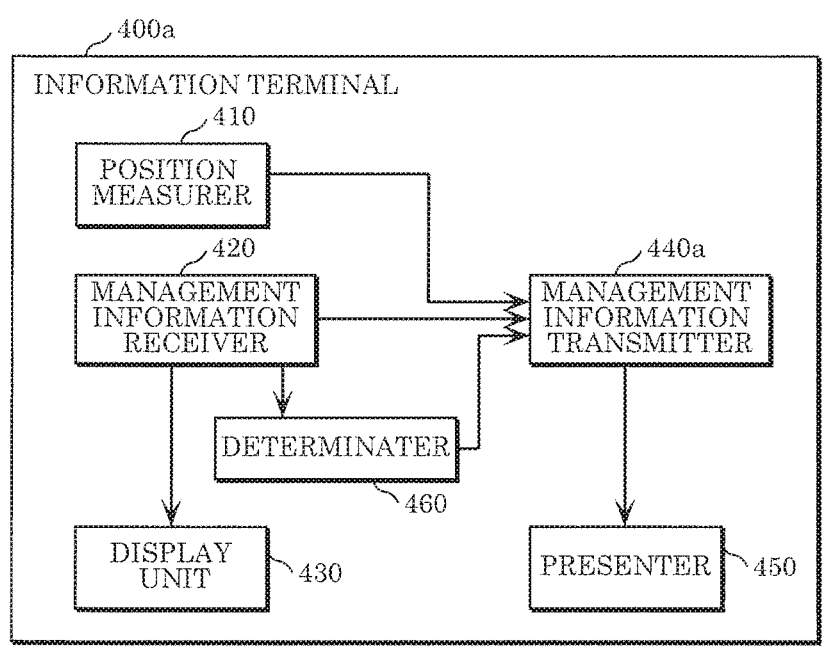
FIG. 7 is a functional block diagram of an information terminal according to Embodiment 2.

FIG. 7 is a functional block diagram of information terminal 400*a*. Information terminal 400*a* achieves the functions of the functional structural elements illustrated in FIG. 7, i.e. position measurer 410, management information receiver 420, display unit 430, management information transmitter 440*a*, presenter 450, and determiner 460, by the processor in controller 403 executing the application. Of the functional structural elements in information terminal 400*a*, the same functional structural elements as those in information terminal 400 (see FIG. 3) are given the same reference marks in FIG. 7, and their description is omitted. Information terminal 400*a* is the same as information terminal 400, with regard to the points not described here.

Determiner 460 has a function of determining whether or not the first management information received by management information receiver 420 indicates an occurrence of an abnormality in power management system 10 and providing the determination result to management information transmitter 440*a*. For example, determiner 460 determines whether or not an abnormality occurrence is indicated, depending on whether or not the state code of storage battery information or the state code of power generation device information in the management information (first management information) illustrated in FIG. 2 has a prescribed code value indicating an abnormality.

Management information transmitter 440*a* is a partial modification to management information transmitter 440 described in Embodiment 1. Like management information transmitter 440, management information transmitter 440a has a function of transmitting the second management information generated based on the first management information received by management information receiver 420 to server 30 via wireless base station 32, by first communication unit 401. The transmission timing is, however, different from that of management information transmitter 440. Management information transmitter 440a combines one or more sets of first management information received by management information receiver 420 for a prescribed period (e.g. 1 week, 1 month) to generate second management information, and periodically transmits the second management information per the prescribed period (e.g. 1 week, 1 month). In other words, the second management information is transmitted each time the prescribed period ends. The second management information may be the same as all of the first management information for the prescribed period, part of all of the first management information for the prescribed period, or the whole or part of all of the first management information for the prescribed period to which other information is added. All of the first management information for the prescribed period and the second management information may have the same format (data form, data structure, whether or not compressed, whether or not encrypted, etc.) or different formats. For example, in terms of reducing the volume of communication with server 30, it is useful if all of the first management information for the prescribed period are compiled (compressed) so that the second management information is in a form representing the same information as all of the first management information with a smaller amount of data. Besides performing the process (periodic transmission process) of periodically transmitting the second management information, management information transmitter 440a exceptionally performs the following process. In the case where the determination result provided from determiner 460 is that the first management information indicates an abnormality occurrence, management information transmitter 440a, without waiting for the end of the prescribed period, combines the first management information already received in the prescribed period to generate the second management information, and transmits the second management information to server 30. Thus, information about an abnormality occurrence in power management system 10 is promptly transmitted to server 30. Subsequently, when the prescribed period ends, management information transmitter 440a combines the first management information received by management information receiver 420 after the abnormality occurrence in the prescribed period to generate the second management information, and transmits the second management information to server 30. In the case where the first management information has not been received by management information receiver 420 in the prescribed period, management information transmitter 440a does not transmit the second management information. In the transmission of the second management information to server 30, management information transmitter 440a adds, to the second management information, the position information obtained by position measurer 410, and transmits the resultant second management information to server 30, in the same way as management information transmitter 440 in Embodiment 1. Management information transmitter 440a also has a function of receiving a message from server 30 as a response to the transmission of the second management information.

(Operation)

An example (operation example) of an information processing method in information terminal 400a that cooperates with power management system 10 is described below. In the application for performing the predetermined information processing including the storage battery information display process and the periodic transmission process, for example, the storage battery information display process is executed in the case where the user performs the predetermined operation on information terminal 400a, and the periodic transmission process is repeatedly executed regardless of operation.

Figure 8:
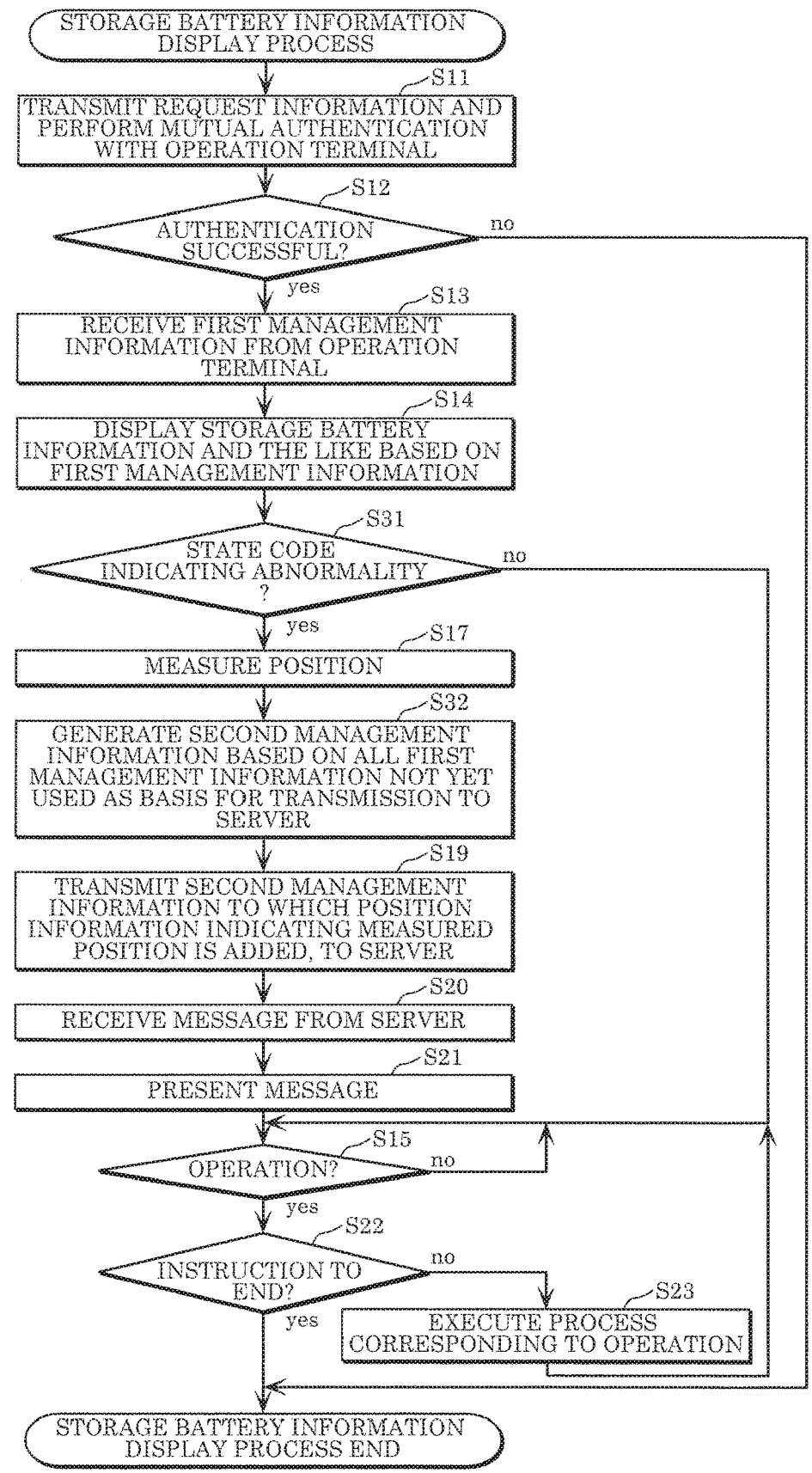
FIG. 8 is a flowchart illustrating an example of a storage battery information display process in the information terminal according to Embodiment 2.

FIG. 8 is a flowchart illustrating an example of the storage battery information display process in information terminal 400a. The storage battery information display process is described below, with reference to the drawing. The same steps as those in the storage battery information display process in Embodiment 1 (FIG. 4) are given the same reference marks in FIG. 8, and their description is simplified as appropriate.

Upon receiving the predetermined operation for performing the storage battery information display process by input device 404, information terminal 400a transmits request information by second communication unit 402 and performs mutual authentication with operation terminal 300, in order to receive management information from power management system 10 (Step S11). In the case where the mutual authentication is not successful, the storage battery information display process ends.

In the case where the mutual authentication in Step S11 is successful (Step S12), information terminal 400a receives the management information (first management information) using second communication unit 402, by management information receiver 420 (Step S13). The received first management information is held in a storage medium such as memory in information terminal 400a, at least until it is used as a basis for transmission to server 30 (i.e. a basis for the generation of the second management information to be transmitted). When the first management information is received by management information receiver 420, information terminal 400a generates a display element representing storage battery information and the like based on the first management information and displays the display element on display 405, by display unit 430 (Step S14).

Determiner 460 in information terminal 400a determines whether or not the first management information indicates an abnormality occurrence, i.e. whether or not the state code of storage battery information, the state code of power generation device information, or the like has a prescribed code value indicating an abnormality (Step S31).

In the case where determiner 460 determines that the first management information indicates an abnormality occurrence in Step S31, information terminal 400a measures the position by position measurer 410 and generates position information indicating the position, or obtains position information measured most recently and held (Step S17).

Information terminal 400a then generates the second management information based on all first management information (including the first management information indicating the abnormality occurrence) received in Step S13 and not yet used as a basis for the generation of the second management information, by management information transmitter 440a (Step S32).

Following this, management information transmitter 440a in information terminal 400a transmits the second management information to which the position information generated or obtained in Step S17 is added, to server 30 using first communication unit 401 (Step S19).

Figure 9:
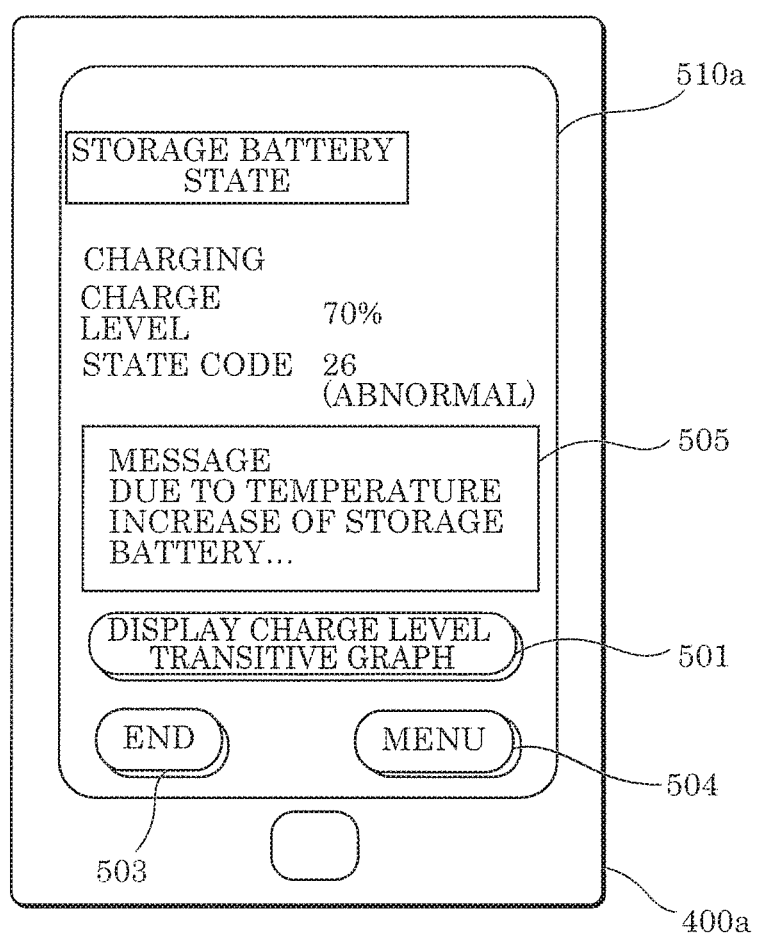
FIG. 9 is a diagram illustrating an example of a screen of the information terminal according to Embodiment 2.

Management information transmitter 440a then receives a message from server 30 as a response (Step S20). Presenter 450 presents the message (Step S21). FIG. 9 illustrates an example of a screen of display 405 in information terminal 400a when presenter 450 presents the message by displaying it on display 405. Screen 510a illustrated in FIG. 9 includes the display element generated in Step S14, and includes message 505 indicating the details of the abnormality occurrence represented by state code, how to handle the abnormality, etc., and buttons 501, 503, and 504 as GUI components same as those in Embodiment 1 (see FIG. 5).

In the case where determiner 460 determines that the first management information does not indicate an abnormality occurrence in Step S31, Steps S17, S32, and S19 to S21 are skipped.

In the case of receiving an operation by the user (Step S15), if the operation is an operation of pressing button 503 for instructing to end (Step S22), information terminal 400a ends the storage battery information display process. If the operation is an operation of pressing any other button, information terminal 400a executes a process corresponding to the operation (Step S23). Information terminal 400a repeatedly receives an operation and executes a process corresponding to the operation, until an operation to end the process is performed (Steps S15, S22, S23).

Figure 10:
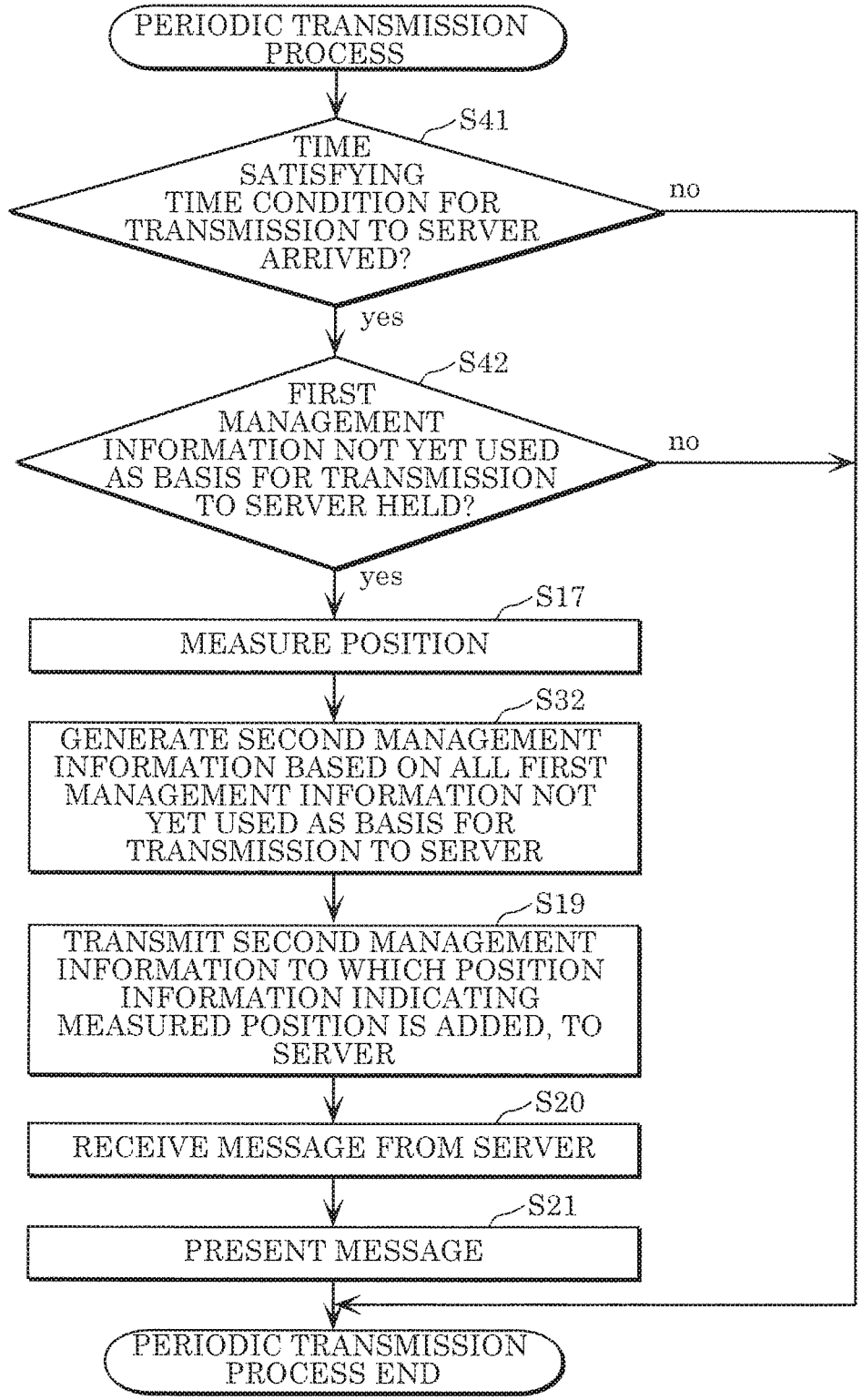
FIG. 10 is a flowchart illustrating an example of a periodic transmission process in the information terminal according to Embodiment 2.

FIG. 10 is a flowchart illustrating an example of the periodic transmission process in information terminal 400a. The periodic transmission process is described below, with reference to the drawing. To periodically transmit the second management information to server 30 per the prescribed period (e.g. 1 week, 1 month), the periodic transmission process is repeatedly executed, for example, with a cycle (e.g. 24 hours) shorter than the prescribed period.

Information terminal 400a determines whether or not a time satisfying a time condition for transmission to server 30 has arrived (Step S41). The time condition is set in information terminal 400a beforehand, and indicates, for example, the end of the prescribed period mentioned above. For example, in the case where the prescribed period is 1 month, information terminal 400a determines whether or not the last day of each month has arrived based on the calendar, and ends the periodic transmission process if the last day has not arrived.

In the case of determining that the time satisfying the time condition for transmission has arrived in Step S41, information terminal 400a determines whether or not first management information not yet used as a basis for transmission to server 30 is held in the storage medium such as memory (Step S42). If such first management information is not held, information terminal 400a ends the periodic transmission process.

In the case of determining that first management information not yet used as a basis for transmission is held in Step S42, information terminal 400a measures the position by position measurer 410 and generates position information, or obtains position information measured most recently and held (Step S17).

Information terminal 400a then generates the second management information based on all first management information not yet used as a basis for transmission (i.e. not yet used as a basis for the generation of the second management information), by management information transmitter 440a (Step S32). The generation of the second management information here is the same as the generation of the second management information in the storage battery information display process (see FIG. 8).

Following this, management information transmitter 440a in information terminal 400a transmits the second management information to which the position information generated or obtained in Step S17 is added, to server 30 using first communication unit 401 (Step S19).

Management information transmitter 440a then receives a message from server 30 as a response (Step S20). Presenter 450 presents the message (Step S21). In the periodic transmission process, Step S21 may be omitted.

Figure 11:
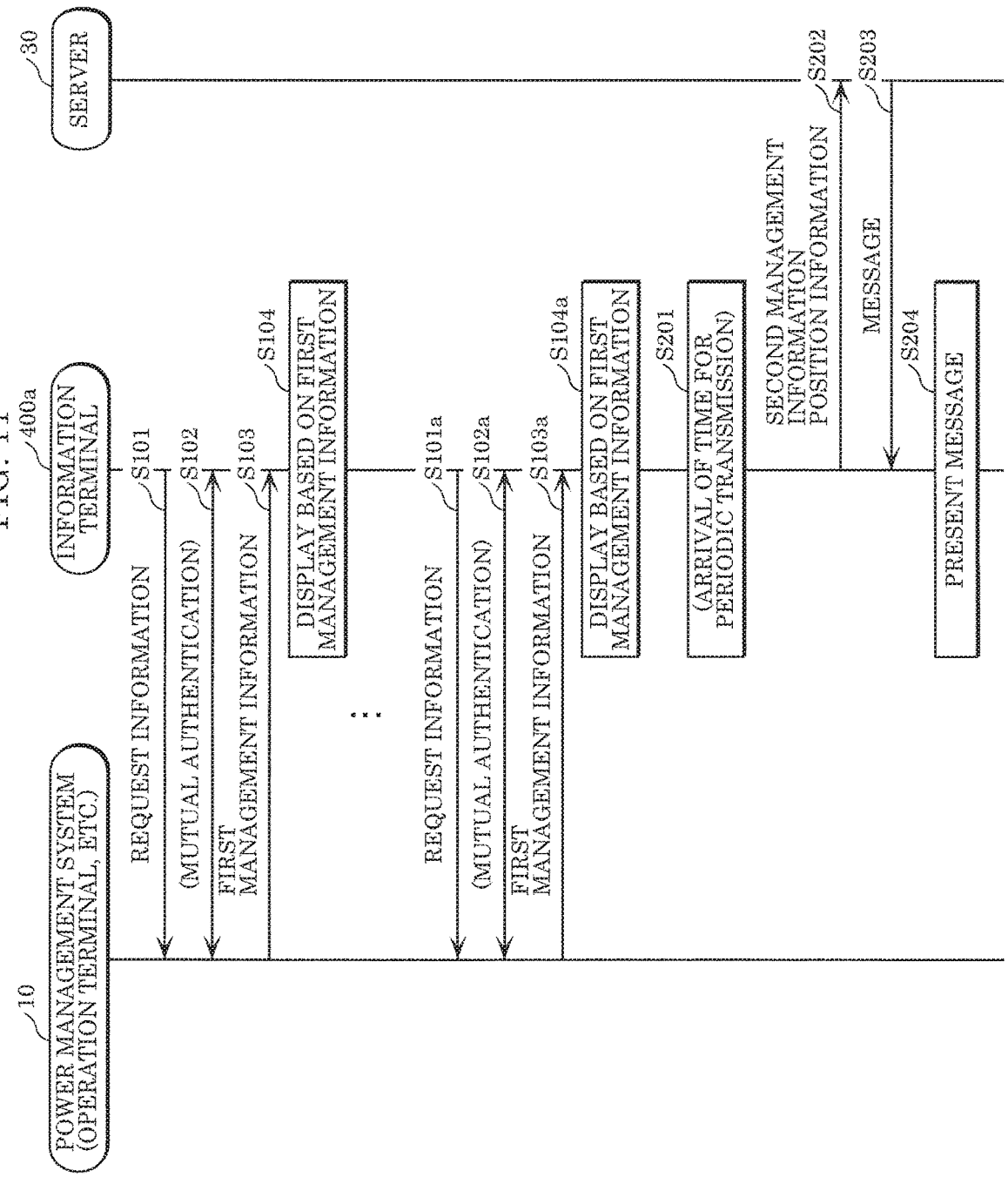
FIG. 11 is a sequence diagram illustrating the cooperation of the information terminal, the power management system, and the server according to Embodiment 2.

FIG. 11 illustrates a process sequence among power management system 10 (operation terminal 300), information terminal 400a, and server 30, as an execution example of the storage battery information display process and the periodic transmission process described above. The same steps as those in the process sequence in Embodiment 1 (see FIG. 6) are given the same reference marks in FIG. 11.

As illustrated in the example in FIG. 11, in the case where the user performs the predetermined operation for executing the storage battery information display process on information terminal 400a in order to check the storage battery state and the like, information terminal 400a transmits the request information to operation terminal 300 (Step S101), and mutual authentication is performed (Step S102). Operation terminal 300 in power management system 10 then transmits the first management information to information terminal 400a by near field communication (Step S103). Information terminal 400a displays a screen indicating the storage battery state and the like, based on the first management information (Step S104). In the case where the user also performs the same operation at another date and time, information terminal 400a transmits the request information (Step S101a), and mutual authentication is performed (Step S102a). Operation terminal 300 then transmits the first management information to information terminal 400a (Step S103a). Information terminal 400a displays a screen based on the first management information (Step S104a). The same process may be further repeated at another date and time.

After this, in the case of determining that the time for periodic transmission (the end of the prescribed period) has arrived (Step S201), information terminal 400a transmits the second management information obtained by combining one or more sets of first management information held with the position information added thereto, to server 30 via wireless base station 32 (Step S202). Server 30 receives the second management information, and, for example, selects a message depending on the second management information and transmits the message to information terminal 400a (Step S203). For example, server 30 transmits, to information terminal 400a, a message indicating the details of the state code indicating the storage battery state in the received second management information. Moreover, for example in the case where the state code indicating the storage battery state in the received second management information indicates an abnormality state, server 30 transmits a message indicating a method of handling the abnormality to information terminal 400a. Upon receiving the message, information terminal 400a presents the message (Step S204). The message may be a character string, audio data, or the like set beforehand in server 30, or a character string, audio data, or the like input by an operator of server 30 (the maintenance company or the like operating server 30). The message may include information indicating an address of a specific web page (such as a page showing an abnormality handling method and the like) in a website.

Thus, information terminal 400a transmits information (second management information) based on management information (first management information) at one or more times in power management system 10, to server 30 via wireless base station 32. Hence, even when facility 20 is not installed with a fixed line, server 30 can obtain the information corresponding to the management information. Server 30 can periodically receive the second management information. Moreover, in the case where an abnormality occurs in power management system 10, server 30 can promptly receive the second management information. The maintenance company or the like operating server 30 and able to view information obtained by server 30 can recognize the status of power management system 10, and, in the case where an abnormality occurs, appropriate handle the situation (e.g. rush to facility 20).

Embodiment 3

Information terminal 400b according to an embodiment of the present invention is described below. Information terminal 400b is a partial modification to information terminal 400a described in Embodiment 2, where a function of transferring control information received from server 30 to power management system 10 is added.

(Structure)

Information terminal 400b has the same hardware structure as information terminal 400 or 400a described in Embodiment 1 or 2, and is the same as information terminal 400 or 400a in that it cooperates with power management system 10 described in Embodiment 1 and accesses server 30 (see FIG. 1). Information terminal 400b executes an application for performing predetermined information processing that includes the storage battery information display process and a periodic transmission control process. The storage battery information display process is the same as that performed by information terminal 400a. The periodic transmission control process is a partial modification to the periodic transmission process performed by information terminal 400a. The periodic transmission control process performed by information terminal 400b includes a process relating to reception of control information from server 30.

Figures 12, 13:
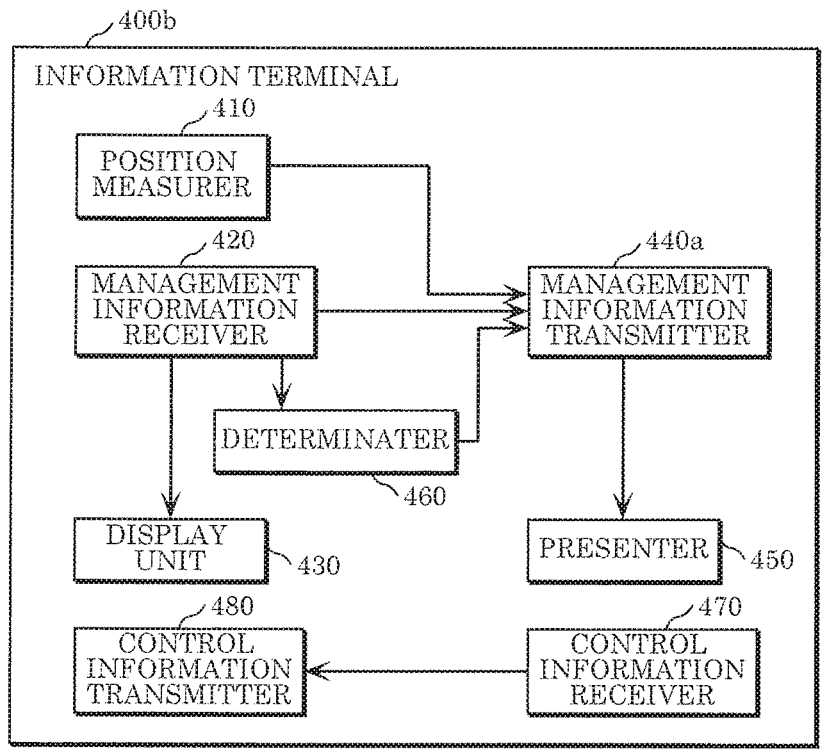
FIG. 12 is a functional block diagram of an information terminal according to Embodiment 3.
FIG. 13 is a diagram illustrating an example of control information which the information terminal according to Embodiment 3 receives from the server.

FIG. 12 is a functional block diagram of information terminal 400b. Information terminal 400b achieves the functions of the functional structural elements illustrated in FIG. 12, i.e. position measurer 410, management information receiver 420, display unit 430, management information transmitter 440a, presenter 450, determinater 460, control information receiver 470, and control information transmitter 480, by the processor in controller 403 executing the application. Of the functional structural elements in information terminal 400b, the same functional structural elements as those in information terminal 400 (see FIG. 3) or information terminal 400a (see FIG. 7) are given the same reference marks in FIG. 12, and their description is omitted. Information terminal 400b is the same as information terminal 400a, with regard to the points not described here.

Control information receiver 470 has a function of, when management information transmitter 440a transmits the second management information to server 30, receiving control information transmitted together with a message from server 30 as a response, by first communication unit 401. The control information is information used to control power management system 10, and includes an output suppression command. The output suppression command includes designation of a time during which power conditioner 200 is to block output of power generated by power generation device 70 to the power system. FIG. 13 illustrates an example of control information. For example, the control information may include designation of control relating to charge/discharge of storage battery 109. Power management system 10 (power conditioner 200, etc.) may perform control relating to charge/discharge of storage battery 109 in power storage device 100 and other control, according to the control information.

Control information transmitter 480 has a function of, after control information receiver 470 receives the control information, transmitting the control information to power management system 10 by second communication unit 402. For example, upon the reception of the control information by control information receiver 470, control information transmitter 480 transmits the control information to operation terminal 300. Alternatively, upon the reception of the first management information by information terminal 400b from operation terminal 300 in the storage battery information display process (e.g. Step S13 in FIG. 8), control information transmitter 480 may transmit the control information already received by control information receiver 470, to operation terminal 300.

(Operation)

An example (operation example) of an information processing method in information terminal 400b that cooperates with power management system 10 is described below. In the application for performing the predetermined information processing including the storage battery information display process and the periodic transmission control process, for example, the storage battery information display process is executed in the case where the user performs the predetermined operation on information terminal 400b, and the periodic transmission control process is repeatedly executed regardless of operation. The storage battery information display process is the same as that in information terminal 400a (see FIG. 8).

Figure 14:
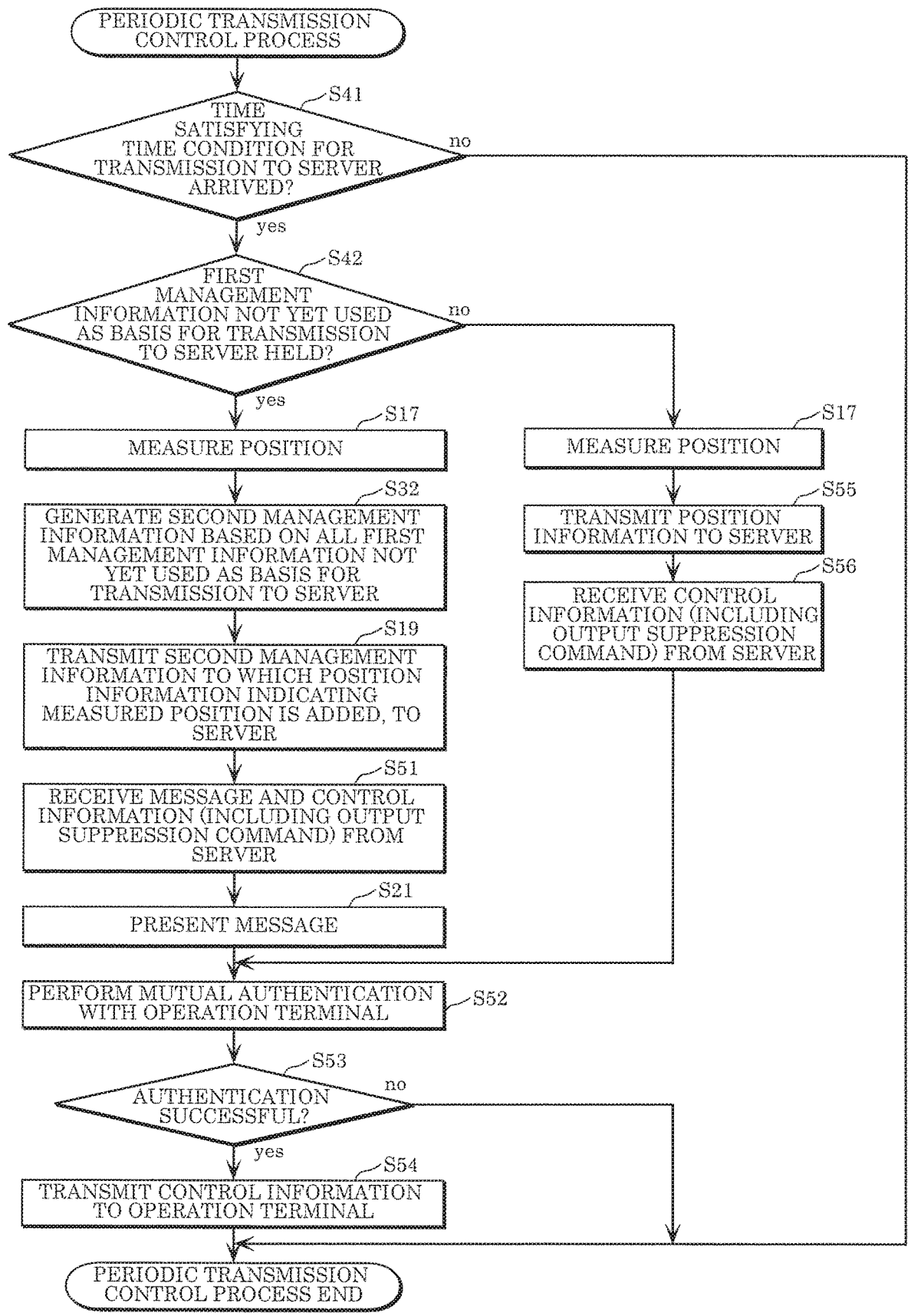
FIG. 14 is a flowchart illustrating an example of a periodic transmission process in the information terminal according to Embodiment 3.

FIG. 14 is a flowchart illustrating an example of the periodic transmission control process in information terminal 400b. The periodic transmission control process is described below, with reference to the drawing. The same steps as those in the periodic transmission process in Embodiment 2 (FIG. 10) are given the same reference marks in FIG. 14, and their description is simplified as appropriate. To periodically transmit the second management information to server 30 per the prescribed period (e.g. 1 week, 1 month), the periodic transmission control process is repeatedly executed, for example, with a cycle (e.g. 24 hours) shorter than the prescribed period.

Information terminal 400b determines whether or not a time satisfying a time condition for transmission to server 30 has arrived (Step S41). In the case where the time satisfying the time condition for transmission has arrived, information terminal 400b determines whether or not first management information not yet used as a basis for transmission to server 30 is held in the storage medium such as memory (Step S42).

In the case of determining that first management information not yet used as a basis for transmission is held in Step S42, information terminal 400b measures the position by position measurer 410 and generates position information indicating the position, or obtains position information measured most recently and held (Step S17). Information terminal 400b then generates the second management information based on all first management information not yet used as a basis for transmission (i.e. not yet used as a basis for the generation of the second management information), by management information transmitter 440a (Step S32). Following this, management information transmitter 440a in information terminal 400b transmits the second management information to which the position information generated or obtained in Step S17 is added, to server 30 using first communication unit 401 (Step S19). Management information transmitter 440a then receives a message from server 30 as a response by first communication unit 401, and control information receiver 470 receives the control information by first communication unit 401 (Step S51). Presenter 450 presents the message (Step S21).

In the case of determining that first management information not yet used as a basis for transmission is not held in Step S42, information terminal 400b measures the position by position measurer 410 and generates position information indicating the position, or obtains position information measured most recently and held (Step S17). Information terminal 400b then transmits the position information to server 30 using first communication unit 401, by management information transmitter 440a (Step S55). Subsequently, control information receiver 470 receives the control information transmitted from server 30 in response to the transmission of the position information, by first communication unit 401 (Step S56).

After the process in Step S21 or S56, information terminal 400b performs mutual authentication with operation terminal 300 using second communication unit 402 (Step S52). In the case where the mutual authentication fails, information terminal 400b ends the periodic transmission control process. In the case where the mutual authentication fails, information terminal 400b may try the mutual authentication a plurality of times.

Figure 15:
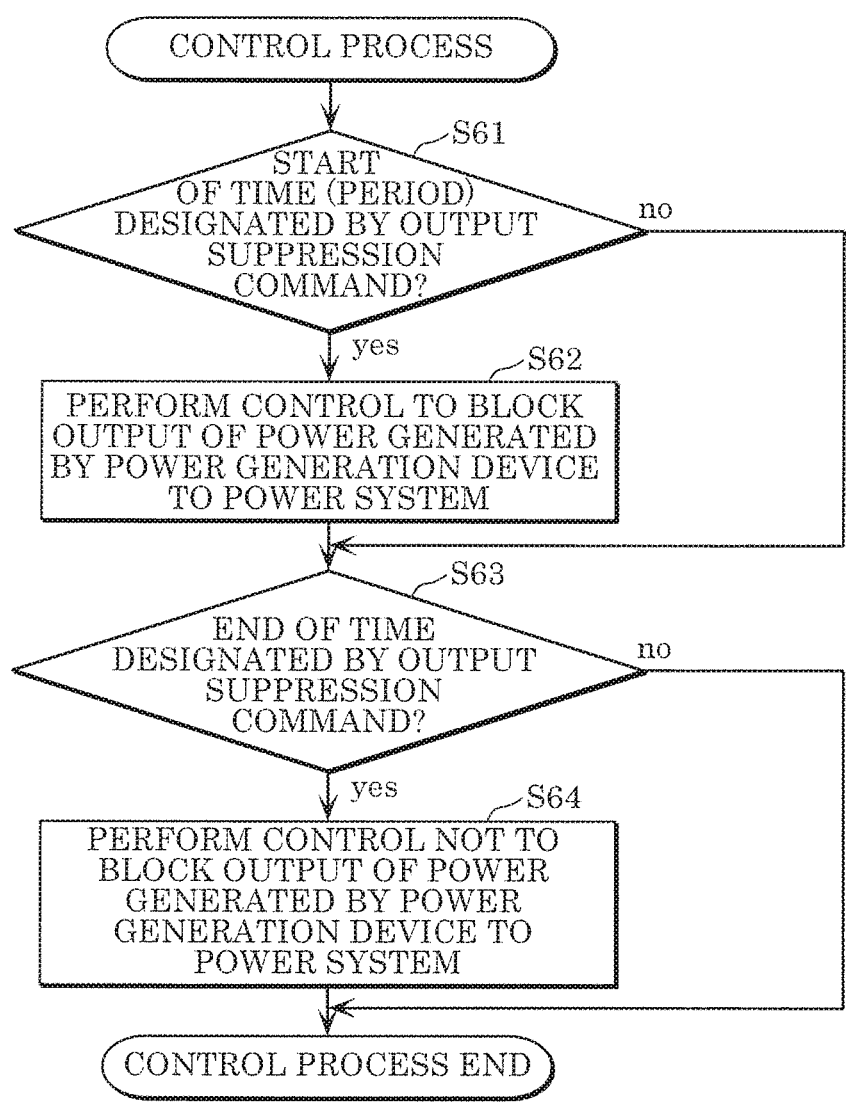
FIG. 15 is a flowchart illustrating an example of a control process in the information terminal according to Embodiment 3.

In the case where the mutual authentication in Step S52 is successful (Step S53), control information transmitter 480 in information terminal 400b transmits (transfers) the control information to operation terminal 300 using second communication unit 402 (Step S54). Upon receiving the control information, operation terminal 300 transfers the control information to power conditioner 200. Power conditioner 200 performs a control process based on the output suppression command included in the control information. The control process is described below, with reference to a flowchart in FIG. 15.

In the case where the start of the time (period) designated by the output suppression command has arrived (Step S61), power conditioner 200 performs control to block output of power generated by power generation device 70 to the power system (Step S62). In the case where the end of the time designated by the output suppression command has arrived (Step S63), power conditioner 200 performs control not to block output of power generated by power generation device 70 to the power system (Step S64).

Figure 16:
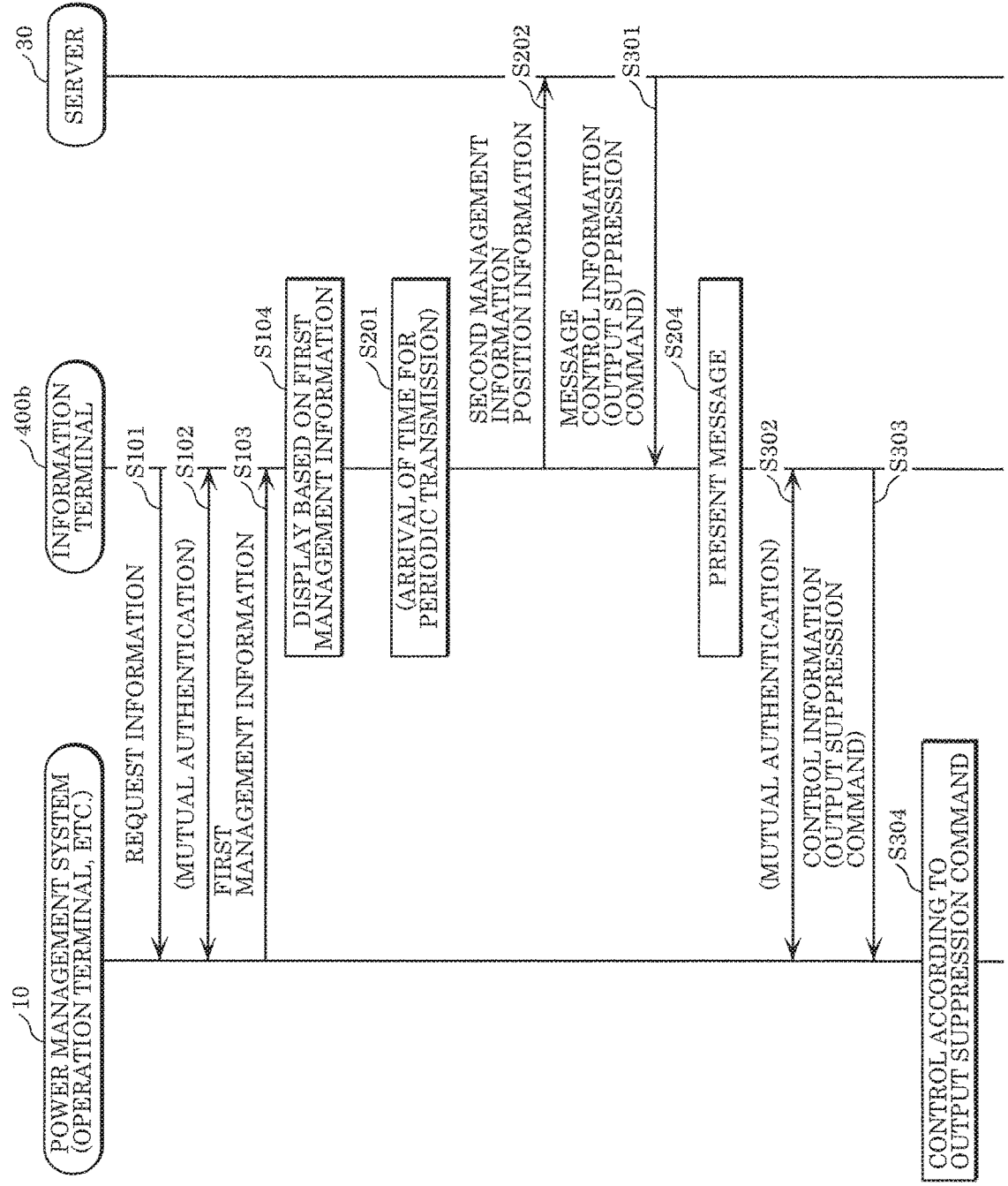
FIG. 16 is a sequence diagram illustrating the cooperation of the information terminal, the power management system, and the server according to Embodiment 3.

FIG. 16 illustrates a process sequence among power management system 10 (operation terminal 300), information terminal 400b, and server 30, as an execution example of the storage battery information display process and the periodic transmission control process described above. The same steps as those in the process sequence in Embodiment 1 or 2 (see FIG. 6 or 11) are given the same reference marks in FIG. 16.

In this example, when accessed by information terminal 400b with position information, server 30 performs a function of transmitting the output suppression command as necessary based on the position information. The details of the output suppression command (designation of time, etc.) may be input to server 30 as necessary by, for example, the electric power provider or the maintenance company operating server 30.

As illustrated in the example in FIG. 16, in the case where the user performs the predetermined operation for executing the storage battery information display process on information terminal 400b in order to check the storage battery state and the like, information terminal 400b transmits the request information to operation terminal 300 (Step S101), and mutual authentication is performed (Step S102). Operation terminal 300 in power management system 10 then transmits the first management information to information terminal 400b by near field communication (Step S103). Information terminal 400b displays a screen indicating the storage battery state and the like, based on the first management information (Step S104). Steps S101 to S104 may be repeated at another date and time.

After this, in the case of determining that the time for periodic transmission has arrived (Step S201), information terminal 400b transmits the second management information obtained by combining one or more sets of first management information held with the position information added thereto, to server 30 via wireless base station 32 (Step S202). Server 30 receives the second management information. Server 30 then transmits the control information including, for example, the message selected depending on the second management information and the output suppression command corresponding to the position information, to information terminal 400b (Step S301). Information terminal 400b receives the message and the control information, by first communication unit 401.

Information terminal 400b then presents the received message (Step S204). Information terminal 400b also performs mutual authentication with operation terminal 300 (Step S302), and transmits (transfers) the received control information including the output suppression command to operation terminal 300 using second communication unit 402 (Step S303). Upon receiving the control information, operation terminal 300 provides the control information to power conditioner 200. Power conditioner 200 performs control corresponding to the control information. As such control, for example, power conditioner 200 performs the control process (see FIG. 15) according to the output suppression command (Step S304).

Thus, information terminal 400b transmits information (second management information) based on management information (first management information) at one or more times in power management system 10, to server 30 via wireless base station 32. Hence, even when facility 20 is not installed with a fixed line, server 30 can obtain the information corresponding to the management information. This enables server 30 to remotely monitor power management system 10. Moreover, even when facility 20 is not installed with a fixed line, server 30 can transmit the output suppression command for preventing power management system 10 from outputting power generated by power generation device 70 to the power system, to power management system 10 via information terminal 400b. In this way, the power management system can be operated appropriately, Other Embodiments, Etc.

While the information terminal, information processing method, etc. according to each of Embodiments 1 to 3 have been described above, the foregoing embodiments are merely examples, and various changes, additions, omissions, and the like are possible.

Although the foregoing embodiments each describe an example where information terminal 400, 400a, or 400b communicates with operation terminal 300 in power management system 10 based on the near field communication standard, information terminal 400, 400a, or 400b may communicate with a device (e.g. power conditioner 200) other than operation terminal 300 in power management system 10. Moreover, second communication unit 402 in information terminal 400, 400a, or 400b may connect to power management system 10 (e.g. operation terminal 300) via a cable (signal line) and perform wired communication, or perform infrared communication or wireless communication using a wireless LAN with power management system 10. Mutual authentication between information terminal 400, 400a, or 400b and power management system 10 (operation terminal 300, etc.) may be omitted.

Although the above describes the case where operation terminal 300 includes a display and is capable of displaying management information, operation terminal 300 may not include a display.

Although the above describes the case where power management system 10 includes distribution board 40, power generation device 70, and operation terminal 300, one or more of distribution board 40, power generation device 70, and operation terminal 300 may be omitted. Moreover, power conditioner 200 and power storage device 100 may have separate housings, or may be contained in the same housing. In the case where power conditioner 200 and power storage device 100 have separate housings, for example, power conditioner 200 and power storage device 100 may be separately located outdoors (outside the building) and indoors in facility 20. In the case where power conditioner 200 and power storage device 100 are contained in the same housing, power conditioner 200 and power storage device 100 may share part of the hardware structure.

Information terminal 400, 400a, or 400b may have a structure of being functionally divided between a plurality of housings that can communicate with each other by near field communication or wireless LAN.

Server 30 may omit the transmission of the message upon receiving the second management information. Moreover, although server 30 can designate a plurality of future times in the output suppression command, in a certain case where the issuance of the output suppression command is not necessary, server 30 may not include the output suppression command in the control information. Further, in a certain case, server 30 may omit the transmission of the control information.

Although the foregoing embodiment describes an example where information terminal 400 transmits the second management information to server 30 in the case of receiving the instruction (operation of pressing button 502) relating to the transmission of the management information to server 30, the second management information may be transmitted to server 30 without waiting for the instruction. Although the foregoing embodiments describe an example where, if the management information indicates an abnormality occurrence, information terminal 400a or 400b transmits the second management information to server 30 regardless of whether or not the time condition for periodic transmission is satisfied (see Steps S31, S17, S32, S19 in FIG. 8), this transmission process may be omitted so that the second management information is equally transmitted to server 30 by the periodic transmission process (see FIG. 10) even in the case of an abnormality occurrence. Information terminal 400a or 400b may promptly transmit the second management information to server 30 not only in the case where the management information indicates an abnormality occurrence but also in the case where another prescribed condition is satisfied.

The execution orders of the processes (such as the procedures illustrated in FIGS. 4, 6, 8, 10, 11, and 14 to 16) in information terminal 400, 400a, or 400b, power management system 10, and server 30 are not limited to the orders described above, and the execution orders may be changed and part of the processes may be omitted without departing from the scope of the present invention. The whole or part of the processes may be realized by hardware, or realized by software. A process by software is realized by a processor in each device executing a control program stored in memory. The control program may be recorded in a recording medium and distributed or circulated. For example, by installing the distributed control program in an information terminal (computer) and causing a processor to execute the program, the whole or part of the processes illustrated in FIGS. 4, 8, 10, 14, and 15 can be performed by the information terminal (computer).

Any embodiment obtained by combining the structural elements and functions in the foregoing embodiments, variations, and the like is also included in the scope of the present invention.

General and specific aspects of the present invention include a device, a system, a method, an integrated circuit, a computer program, a computer-readable recording medium, and any combination thereof.

The following describes the structures, variations, advantageous effects, etc. of an information terminal, an information processing method, and a control program according to an aspect of the present invention.

(1) An information processing method according to an aspect of the present invention is an information processing method used in information terminal 400, 400a, or 400b including: first communication unit 401 that performs wireless communication with wireless base station 32 connected to wide area network 31; and second communication unit 402 that performs communication by a communication scheme different from first communication unit 401, the information processing method including: receiving, by second communication unit 402, first management information from power management system 10 that is installed in facility 20 and includes storage battery 109, the first management information including information relating to storage battery 109 (e.g. Step S13); and transmitting, by first communication unit 401, second management information generated based on the first management information received in the receiving, to a device (e.g. server 30) outside facility 20 as a destination, the device outside facility 20 being connected to wide area network 31 (e.g. Steps S18 and S19).

Thus, the information relating to power management system 10 installed in facility 20 is transmitted to the outside device (server 30). This enables remote monitoring by server 30, even when facility 20 is not installed with a fixed line. When a maintenance company or the like with sufficient expertise on power storage devices, etc. operates server 30 using this information processing method, an occurrence of an abnormality in power management system 10 can be handled efficiently and appropriately.

(2) For example, in the receiving, the first management information may be received by second communication unit 402 that performs communication by a near field communication scheme narrower in communicable range than first communication unit 401.

Thus, even when information terminal 400, 400a, or 400b and power management system 10 are not connected via a cable, by bringing them close to each other to a certain short distance, information terminal 400 or the like can receive the first management information. Accordingly, the user can easily realize remote monitoring of power management system 10 by server 30.

(3) For example, power management system 10 may include operation terminal 300 that has a function of receiving an operation, a function of displaying the information relating to storage battery 109, and a communication function, and in the receiving, the first management information may be received from operation terminal 300 in a case where mutual authentication between operation terminal 300 and information terminal 400, 400a, or 400b is successful.

Thus, the user can realize the transmission of the information relating to power management system 10 to the server comparatively easily. It is comparatively easy for the user to put, in a state in which the first management information is transmittable, information terminal 400 or the like and operation terminal 300 which is typically located at a position easily operable by the user from among the devices constituting power management system 10.

(4) For example, information terminal 400, 400a, or 400b may include display 405, and the information processing method may further include: displaying, on display 405, a display element based on the first management information received in the receiving (e.g. Step S14).

Thus, the user can view storage battery information and the like included in the already obtained first management information, on information terminal 400 or the like.

(5) For example, information terminal 400, 400a, or 400b may include input device 404, in the receiving, when input device 404 receives a predetermined operation, request information may be transmitted to power management system 10 by second communication unit 402, and the first management information transmitted from power management system 10 that has received the request information may be received by second communication unit 402, and in the displaying, the display element may be displayed based on the first management information, when the first management information is received in the receiving.

Thus, when, in order to view storage battery information or the like, the user puts information terminal 400 or the like in a state in which the information is viewable, information terminal 400 or the like can obtain information that needs to be transmitted to server 30 for remote monitoring.

(6) For example, in the transmitting, the second management information generated based on the first management information may be transmitted, when the first management information is received in the receiving.

Thus, when information terminal 400 or the like obtains the information from power management system 10, server 30 can obtain the information for remote monitoring. For example in the case where an abnormality occurs in power management system 10, a maintenance company or the like operating server 30 can promptly handle the abnormality.

(7) For example, the information processing method may further include: presenting, in a case where a message is received from the device (server 30) outside the facility as the destination when the second management information is transmitted in the transmitting, the message (e.g. Steps S20 and S21).

Thus, for example in the case where an abnormality occurs in power management system 10, a method of handling the abnormality, etc. can be notified from server 30.

(8) For example, in the receiving, the first management information may be received at each of a plurality of times different from each other, and in the transmitting, one set of the second management information may be generated based on the first management information received at each of the plurality of times in the receiving, and transmitted to server 30 as the destination (e.g. Step S32).

Thus, the volume of communication between information terminal 400a, 400b, or the like and server 30 can be reduced. This contributes to, for example, lower communication cost.

(9) For example, the information processing method may further include: determining whether or not the first management information indicates an occurrence of an abnormality in power management system 10, when the first management information is received in the receiving (e.g. Step S31), wherein in the transmitting, the second management information generated based on the first management information is transmitted, when the first management information is determined to indicate the occurrence of the abnormality in the determining.

Thus, in the case where an abnormality occurs in power management system 10, the second management information is promptly transmitted to server 30, so that the abnormality can be handled promptly.

(10) For example, the information processing method may further include: receiving, by first communication unit 401, control information transmitted from a device (server 30 or another device) connected to wide area network 31, the control information being used to control power management system 10 (e.g. Step S51); and transmitting, by second communication unit 402, the control information received in the receiving of the control information to power management system 10 (e.g. Step S54).

Thus, even when facility 20 is not installed with a fixed line, server 30 or another device (e.g. output suppression command transmission device) can transmit the control information to power management system 10 via information terminal 400b or the like.

(11) For example, in the receiving of the control information, the control information may be received from the device (server 30) outside the facility and connected to wide area network 31, and in the transmitting of the control information, the control information is transmitted when the first management information is received in the receiving.

Thus, the control information is transmitted when information terminal 400b is in a state of being communicable with power management system 10. The control information can therefore be transmitted efficiently as compared with the case where the transmission is attempted in a non-communicable state.

(12) For example, power management system 10 may include power generation device 70 and power conditioner 200 connected to power generation device 70, in power management system 10, in a case where an output suppression command is received, power conditioner 200 may block output of power generated by power generation device 70 to a power system in a time designated by the output suppression command, and the control information received in the receiving of the control information may include the output suppression command.

Thus, even when facility 20 is not installed with a fixed line, server 30 can transmit the output suppression command to power management system 10 via information terminal 400b or the like.

(13) For example, the information processing method may further include: measuring a position of information terminal 400, 400a, or 400b when the first management information is received in the receiving (e.g. Step S17), wherein in the transmitting, the second management information to which position information indicating the position measured in the measuring is added is transmitted.

Thus, the maintenance company or the like operating server 30 can recognize the position of power management system 10. In the case where an abnormality occurs in power management system 10, prompt handling such as rushing to facility 20 is possible.

(14) Information terminal 400, 400a, or 400b according to an aspect of the present invention includes: first communication unit 401 that performs wireless communication with wireless base station 32 connected to wide area network 31; second communication unit 402 that performs communication by a communication scheme different from first communication unit 401; and controller 403 that: controls second communication unit 402 to receive first management information from power management system 10 that is installed in facility 20 and includes storage battery 109, the first management information including information relating to storage battery 109; and controls first communication unit 401 to transmit second management information generated based on the first management information received, to a device (server 30) outside facility 20 as a destination, the device outside the facility being connected to wide area network 31.

Thus, the information relating to power management system 10 installed in facility 20 can be transmitted to server 30. This enables remote monitoring of power management system 10 by server 30, even when facility 20 is not installed with a fixed line.

(15) A control program according to an aspect of the present invention is a control program for causing information terminal 400, 400a, or 400b to execute predetermined information processing, information terminal 400, 400a, or 400b including: first communication unit 401 that performs wireless communication with wireless base station 32 connected to wide area network 31; second communication unit 402 that performs communication by a communication scheme different from first communication unit 401; and a microprocessor, the predetermined information processing including: causing second communication unit 402 to receive first management information from power management system 10 that is installed in facility 20 and includes storage battery 109, the first management information including information relating to storage battery 109 (e.g. Step S13); and causing first communication unit 401 to transmit second management information generated based on the first management information received, to a device (server 30) outside facility 20 as a destination, the device outside the facility being connected to wide area network 31 (e.g. Steps S18 and S19).

By installing the control program onto information terminal 400 or the like and causing a microprocessor to execute the control program, the information relating to power management system 10 installed in facility 20 can be transmitted to server 30 via information terminal 400 or the like. This enables remote monitoring of power management system 10 by server 30, even when facility 20 is not installed with a fixed line.

The invention claimed is:

1. An information processing method used in an information terminal including: a first communication unit that performs wireless communication with a wireless base station connected to a wide area network; and a second communication unit that performs communication by a communication scheme different from the first communication unit, and a presenter, the information processing method comprising:
receiving, by the second communication unit, first management information from a power management system that is installed in a facility and includes a storage battery, the first management information including information relating to the storage battery;
transmitting, by the first communication unit, second management information generated based on the first management information received in the receiving, to a device outside the facility as a destination, the device outside the facility being connected to the wide area network; and
receiving, by the first communication unit, a message indicating details of an abnormality which has occurred and how to handle the abnormality, and presenting the message received, the message being transmitted from the device based on the second management information.

2. The information processing method according to claim 1,
wherein in the receiving, the first management information is received by the second communication unit that performs communication by a near field communication scheme narrower in communicable range than the first communication unit.

3. The information processing method according to claim 1,
wherein the power management system includes an operation terminal that has a function of receiving an operation, a function of displaying the information relating to the storage battery, and a communication function, and
in the receiving, the first management information is received from the operation terminal in a case where mutual authentication between the operation terminal and the information terminal is successful.

4. The information processing method according to claim 1,
wherein the information terminal includes a display,
the information processing method further comprising:
displaying, on the display, a display element based on the first management information received in the receiving.

5. The information processing method according to claim 4,
wherein the information terminal includes an input device,
in the receiving, when the input device receives a predetermined operation, request information is transmitted to the power management system by the second communication unit, and the first management information transmitted from the power management system that has received the request information is received by the second communication unit, and
in the displaying, the display element is displayed based on the first management information, when the first management information is received in the receiving.

6. The information processing method according to claim 1,
wherein in the transmitting, the second management information generated based on the first management information is transmitted, when the first management information is received in the receiving.

7. The information processing method according to claim 6, further comprising:
presenting, in a case where a message is received from the device outside the facility as the destination when the second management information is transmitted in the transmitting, the message.

8. The information processing method according to claim 1,
wherein in the receiving, the first management information is received at each of a plurality of times different from each other, and
in the transmitting, one set of the second management information is generated based on the first management information received at each of the plurality of times in the receiving, and transmitted to a server as the destination.

9. The information processing method according to claim 1, wherein the information processing method further comprises:
presenting, by the presenter, a display element based on the first management information received in the receiving, and
the presenting is performed between the receiving and the transmitting.

10. The information processing method according to claim 8, further comprising:
determining whether or not the first management information indicates an occurrence of an abnormality in the power management system, when the first management information is received in the receiving,
wherein in the transmitting, the second management information generated based on the first management information is transmitted, when the first management information is determined to indicate the occurrence of the abnormality in the determining.

11. The information processing method according to claim 1, further comprising:
receiving, by the first communication unit, control information transmitted from a device connected to the wide area network, the control information being used to control the power management system; and
transmitting, by the second communication unit, the control information received in the receiving of the control information to the power management system.

12. The information processing method according to claim 11,
wherein in the receiving of the control information, the control information is received from the device outside the facility and connected to the wide area network, and
in the transmitting of the control information, the control information is transmitted when the first management information is received in the receiving.

13. The information processing method according to claim 11,
wherein the power management system includes a power generation device and a power conditioner connected to the power generation device,
in the power management system, in a case where an output suppression command is received, the power conditioner blocks output of power generated by the power generation device to a power system in a time designated by the output suppression command, and
the control information received in the receiving of the control information includes the output suppression command.

14. The information processing method according to claim 1, further comprising:
measuring a position of the information terminal when the first management information is received in the receiving,
wherein in the transmitting, the second management information to which position information indicating the position measured in the measuring is added is transmitted.

15. An information terminal, comprising:
a first communication unit that performs wireless communication with a wireless base station connected to a wide area network;
a second communication unit that performs communication by a communication scheme different from the first communication unit;
a presenter; and
a controller that: controls the second communication unit to receive first management information from a power management system that is installed in a facility and includes a storage battery, the first management information including information relating to the storage battery; controls the first communication unit to transmit second management information generated based on the first management information received, to a device outside the facility as a destination, the device outside the facility being connected to the wide area network; causes the first communication unit to receive a message indicating details of an abnormality which has occurred and how to handle the abnormality; and causes the presenter to present the message received, the message being transmitted from the device based on the second management information.

16. A control program for causing an information terminal to execute predetermined information processing, the information terminal including: a first communication unit that performs wireless communication with a wireless base station connected to a wide area network; a second communication unit that performs communication by a communication scheme different from the first communication unit; a presenter, and a microprocessor, the predetermined information processing comprising:
causing the second communication unit to receive first management information from a power management system that is installed in a facility and includes a storage battery, the first management information including information relating to the storage battery;
causing the first communication unit to transmit second management information generated based on the first management information received, to a device outside the facility as a destination, the device outside the facility being connected to the wide area network; and
receiving, by the first communication unit, a message indicating details of an abnormality which has occurred and how to handle the abnormality, and presenting the message received, the message being transmitted from the device based on the second management information.

\* \* \* \* \*